US008592045B2

(12) United States Patent
Olsson

(10) Patent No.: US 8,592,045 B2
(45) Date of Patent: Nov. 26, 2013

(54) ANTIMICROBIAL CURRENCY, MATERIAL AND METHOD

(75) Inventor: Anders Olsson, Bangkok (TH)

(73) Assignee: Microban Products Company, Huntersville, NC (US)

( * ) Notice: Subject to any disclaimer, the term of this patent is extended or adjusted under 35 U.S.C. 154(b) by 612 days.

(21) Appl. No.: 12/526,283

(22) PCT Filed: Feb. 9, 2007

(86) PCT No.: PCT/US2007/061887
§ 371 (c)(1),
(2), (4) Date: Oct. 26, 2010

(87) PCT Pub. No.: WO2008/097314
PCT Pub. Date: Aug. 14, 2008

(65) Prior Publication Data

US 2011/0200656 A1 Aug. 18, 2011

(51) Int. Cl.

| | |
|---|---|
| ***B32B 5/16*** | (2006.01) |
| ***B32B 27/00*** | (2006.01) |
| ***B05D 3/02*** | (2006.01) |

(52) U.S. Cl.
USPC ......... 428/500; 428/323; 428/327; 427/372.2

(58) Field of Classification Search
None
See application file for complete search history.

(56) References Cited

U.S. PATENT DOCUMENTS

2005/0249880 A1* 11/2005 Wallace et al. ............ 427/372.2
2006/0147502 A1* 7/2006 Koenig et al. ................. 424/443

FOREIGN PATENT DOCUMENTS

KR 20-2003-384003 Y1 5/2005

OTHER PUBLICATIONS

Search Report and Written Opinion, dated Oct. 24, 2007, in parent application PCT/US2007/061887.

* cited by examiner

*Primary Examiner* — Sheeba Ahmed
(74) *Attorney, Agent, or Firm* — Cliff D. Weston

(57) ABSTRACT

A material for use in currency comprises an antimicrobial polymer material which can be used in the manufacture of banknotes having security features therein. The material can be a sheet or substrate and/or an acrylate polymer coat applied to at least one surface of a banknote.

17 Claims, No Drawings

ANTIMICROBIAL CURRENCY, MATERIAL AND METHOD

BACKGROUND OF THE INVENTION

1. Field of the Invention

The present invention relates to a material for use in currency and currency made therefrom. More particularly, the invention includes an antimicrobial polymer material which can be used in the manufacture of banknotes having security features therein.

2. Prior Art

Banknotes historically have been constructed of a paper or a paper-like fabric. Currency paper in the United States, for example, is composed of 25% linen and 75% cotton. Presently, some countries are experimenting with a "paper" banknote made in whole or in part of one or more polymers. Australia, Mexico, Brazil, Indonesia and China are among the nations testing or rolling out polymer-based banknotes.

Over the course of a banknote's life, it is handled by countless individuals. In addition to handling, banknotes are routinely placed in pockets, purses, wallets, socks and other containers/locations where microbes can be found and can grow.

The likelihood of a banknote becoming contaminated with microbes is very high, as confirmed by culturing and plating of used banknotes. Bacteria can readily colonize on fiber-based and even polymer banknotes, facilitating cross-contamination and the spread of infections and/or diseases. Even were the banknote constructed wholly of one or more conventional polymers on which microbes do not traditionally flourish, such microbes certainly could survive thereon and be transmitted from one person to the next.

Banknotes typically include a number of security features to prevent counterfeiting. Specialized fibers may be interwoven into the fabric of the banknote. Red and blue fibers have long been an ingredient of U.S. paper currency. Special features such as these fibers are embedded in currency paper to ensure that reproduction is difficult. While some counterfeiters attempt to draw these fibers onto the surface of the bill, close inspection reveals the absence of the authentic embedded fiber and the clear presence of crude lines drawn on the surface. Prior to approximately 1941, such anti-counterfeit fibers were silk. Presently, red and blue synthetic fibers of various lengths are distributed evenly throughout the paper.

Security threads are useful anti-counterfeiting features and now run the width of U.S. paper currency. In some early versions of U.S. paper currency, thin security threads were added to paper. In these currencies, the number of threads in the paper represented a specific denomination. Continuing with example of U.S paper currency, the thread for the modern $100 bill bears the phrase "USA 100". This thread print also can only be seen with transmitted light, which makes photocopy-based counterfeiting impossible.

In addition, new U.S. security threads glow red when held over ultraviolet light. Other printed features can include inks comprising metallic flakes or particles, holographic images, and the like. These features give the printed element a visual aspect that cannot readily be xerographically or otherwise reproduced.

Banknotes also may have a watermark added thereto. A watermark is created during the paper banknote making process and is caused by variations in the density of the paper. As light passes through the tiny variations in thickness, different light tones are observed. These varying tones form a clear image when held up to transmitted light.

One key requirement of an antimicrobial or bactericidal banknote is the antimicrobial additive must not materially affect key properties of the banknotes, such as durability or one or more of the security measures as discussed above.

DESCRIPTION OF THE PREFERRED EMBODIMENTS

As used herein, the terms "microbe" or "microbial" should be interpreted to encompass any of the microscopic organisms commonly studied by microbiologists. Such organisms include, but are not limited to, bacteria and fungi as well as other single-celled organisms such as mold, mildew and algae. Viral particles and other infectious agents are also included in the term microbe.

The term "antimicrobial" includes biostatic activity, i.e., where the proliferation of microbiological species is reduced or eliminated, and true biocidal activity where microbiological species are killed. For ease of discussion, this detailed description may make reference to bacteria and antibacterial agents. This method of presentation should not be interpreted as limiting the scope of the invention in any way.

The term efficacy, as used herein, is defined as the characteristic of inhibiting the growth of a microbe on a substrate. In the broadest sense, an antimicrobial banknote has bactericidal ("kill") efficacy, which helps to counteract the public health concern of bacterial transfer from one handler of the banknote to the next.

In a first embodiment, a sheet or planar substrate material is comprised of a polymer, such as a polypropylene film.

A banknote manufactured using a polymeric planar material, with or without an antimicrobial agent disposed therein, may alternatively or additionally bear one or more layers of a superficial polymer affixed thereto or disposed thereon. That is, a bank note can be manufactured of the antimicrobial planar material described above and one or more acrylate coating layers applied thereto; alternatively, a bank note made of a "pure" polymeric planar material can have affixed thereto or disposed thereon an acrylate layer, the acrylate polymer layer containing one or more antimicrobial agents.

The superficial polymeric layer or coating can be a transparent acrylate polymer layer or coating. This superficial polymer layer/coating can be applied to protect the printing and the note itself. The methods for applying such coatings are known to those of skill in the bank note manufacturing art.

Two thin layers generally can applied on each side of the banknote, for a total thickness of perhaps 6 microns per note. Greater or lesser total thicknesses can be employed as desired by the bank note producer without departing from the inventive concept disclosed herein.

The acrylate superficial polymer coating composition may be cured in a variety of methods, including via an ultraviolet radiation curing process. The UV curing process is especially attractive, as more rapid curing of the coating material permits higher-speed banknote production lines. However, many antimicrobial agents are known to be susceptible to degradation upon exposure to ultraviolet radiation.

It should be noted that susceptibility of the antimicrobial agent to ultraviolet irradiation can be present regardless of the placement of the agent(s) in the polymeric planar material, the acrylate coating composition, or both.

Effective antimicrobial agents can be incorporated into the planar polymeric material, the acrylate coating composition, or both. Suitable agents include silver, copper or zinc in various forms, such as in zeolite or amorphous glass powder. Silver, for example, alternatively may be utilized in ionic or elemental form or in sol/gel form; the general concept being that the inorganic antimicrobial be disposed in the currency material in an ion exchangeable form. In some cases, it may be desirable to add a dispersing agent with the antimicrobial agent to prevent agglomeration of the antimicrobial agent in the currency material.

Surprisingly, 2,4,4'-trichloro-2'-hydroxydiphenyl ether, which is a diphenyl ether (bis-phenyl) derivative, has proven to be an effective antimicrobial additive. Triclosan is widely known to be sensitive to ultraviolet radiation, and it was not expected that it would be suitable for use in a UV curing process.

Similarly, isothiazolone-based compounds selected from the group consisting of 1,2-benzisothiazolin-3-one (CAS No. 2634-33-5); N-butyl-1,2-benzisothiazolin-3-one (CAS No. 4299-07-4); 2-octyl-isothiazolone (CAS No. 26530-20-1); 4,5-dichloro-2-N-octyl-3(2H)-isothiazolone (CAS No. 64359-81-5); methyl-3(2H)-isothiazolone (CAS No. 2682-20-4); and chloro-2-methyl-3(2H)-isothiazolone (CAS No. 26172-55-4) have been found to be efficacious antimicrobial agents.

Additional antimicrobial agents suitable for use further include diiodomethyl p-tolylsulfone; zinc and sodium pyrithiones; azoles (such as propiconazoles), polyhexamethylene biguanide hydrochloride (PMBH); 3,4,4'-trichlorocarbanilide; photocatalytic titanium dioxide; and barium metaborate monohydrate (i.e., CAS No. 13701-59-2).

Quantitative Evaluation of Antibacterial Activity

For the testing, a protocol was selected which measured the percent kill in a bacterial population over a period of time when put in contact with banknote samples.

Tests were conducted against two common bacteria: the gram-positive *Staphylococcus aureus*, which is found almost everywhere in and on the body, and which can cause numerous infections; as well as the gram-negative *Escherichia coli*, which is a common "bathroom bacteria" that can cause severe food poisoning. With good results against these organisms, efficacy against a broad spectrum of other bacteria can be predicted.

Ten samples marked Secu-GB1-A-260503, Secu-GB2-A-260503, Secu-GB3-A-260503, Secu-GB4-A-260503, Secu-GB5-A-260503, Secu-C-A-260503, Secu-C-B-260503, Secu-C-C-260503, Secu-C-D-260503 and Secu-C-E-260503 were manufactured employing 2,4,4'-trichloro-2'-hydroxydiphenyl ether in the acrylate composition applied as a coating layer on the planar material.

Samples from the bank note prototypes were evaluated for their antibacterial activity in accordance with the modified method AATCC 100-1993. The tests were performed against the organisms *Staphylococcus aureus* ATCC 6538 and *Escherichia coli* ATCC 8739.

TABLE 1

*Staphylococcus aureus*

| Sample | Test | Bacteria Count per Swatch Time 0 | Bacteria Count per Swatch Time 24 hrs | % Reduction |
|---|---|---|---|---|
| Control - No Antibacterial Treatment | 1 | $3.4 \times 10^6$ | $3.3 \times 10^7$ | |
| | 2 | $3.1 \times 10^6$ | $4.2 \times 10^7$ | |
| G. Mean | | $3.2 \times 10^6$ | $3.7 \times 10^7$ | Growth |
| Secu-GB1-260503 | 1 | $4.2 \times 10^7$ | $7.9 \times 10^4$ | |
| | 2 | $5.7 \times 10^7$ | $1.1 \times 10^5$ | |
| G. Mean | | $4.9 \times 10^7$ | $9.3 \times 10^4$ | 99.81% |
| Secu-GB2-260503 | 1 | $4.2 \times 10^7$ | $3.5 \times 10^4$ | |
| | 2 | $5.7 \times 10^7$ | $7.6 \times 10^5$ | |
| G. Mean | | $4.9 \times 10^7$ | $1.6 \times 10^5$ | 99.67% |

TABLE 1-continued

*Staphylococcus aureus*

| Sample | Test | Bacteria Count per Swatch Time 0 | Bacteria Count per Swatch Time 24 hrs | % Reduction |
|---|---|---|---|---|
| Secu-GB3-260503 | 1 | $4.2 \times 10^7$ | $7.4 \times 10^4$ | |
| | 2 | $5.7 \times 10^7$ | $2.3 \times 10^5$ | |
| G. Mean | | $4.9 \times 10^7$ | $1.3 \times 10^5$ | 99.73% |
| Secu-GB4-260503 | 1 | $4.2 \times 10^7$ | $7.7 \times 10^4$ | |
| | 2 | $5.7 \times 10^7$ | $7.5 \times 10^4$ | |
| G. Mean | | $4.9 \times 10^7$ | $7.6 \times 10^4$ | 99.84% |
| Secu-GB5-260503 | 1 | $4.2 \times 10^7$ | $9.9 \times 10^4$ | |
| | 2 | $5.7 \times 10^7$ | $7.2 \times 10^4$ | |
| G. Mean | | $4.9 \times 10^7$ | $8.4 \times 10^4$ | 99.83% |
| Secu-C-A-260503 | 1 | $4.2 \times 10^7$ | $8.1 \times 10^4$ | |
| | 2 | $5.7 \times 10^7$ | $1.6 \times 10^5$ | |
| G. Mean | | $4.9 \times 10^7$ | $1.1 \times 10^5$ | 99.78% |
| Secu-C-B-260503 | 1 | $4.2 \times 10^7$ | $1.1 \times 10^5$ | |
| | 2 | $5.7 \times 10^7$ | $1.0 \times 10^5$ | |
| G. Mean | | $4.9 \times 10^7$ | $1.0 \times 10^5$ | 99.80% |
| Secu-C-C-260503 | 1 | $4.2 \times 10^7$ | $2.0 \times 10^5$ | |
| | 2 | $5.7 \times 10^7$ | $1.0 \times 10^6$ | |
| G. Mean | | $4.9 \times 10^7$ | $4.5 \times 10^5$ | 99.08% |
| Secu-C-D-260503 | 1 | $4.2 \times 10^7$ | $4.3 \times 10^4$ | |
| | 2 | $5.7 \times 10^7$ | $2.0 \times 10^4$ | |
| G. Mean | | $4.9 \times 10^7$ | $2.9 \times 10^4$ | 99.94% |
| Secu-C-E-260503 | 1 | $4.2 \times 10^7$ | $1.8 \times 10^5$ | |
| | 2 | $5.7 \times 10^7$ | $2.7 \times 10^5$ | |
| G. Mean | | $4.9 \times 10^7$ | $2.2 \times 10^5$ | 99.55% |

TABLE 2

*Escherichia coli*

| Sample | Test | Bacteria Count per Swatch Time 0 | Bacteria Count per Swatch Time 24 hrs | % Reduction |
|---|---|---|---|---|
| Control - No Antibacterial Treatment | 1 | $7.6 \times 10^6$ | $1.0 \times 10^8$ | |
| | 2 | $8.8 \times 10^6$ | $9.2 \times 10^7$ | |
| G. Mean | | $8.2 \times 10^6$ | $9.6 \times 10^7$ | Growth |
| Secu-GB1-260503 | 1 | $9.8 \times 10^7$ | $2.2 \times 10^6$ | |
| | 2 | $8.6 \times 10^7$ | $7.7 \times 10^6$ | |
| G. Mean | | $9.2 \times 10^7$ | $4.1 \times 10^6$ | 95.54% |
| Secu-GB2-260503 | 1 | $9.8 \times 10^7$ | $1.9 \times 10^6$ | |
| | 2 | $8.6 \times 10^7$ | $1.3 \times 10^6$ | |
| G. Mean | | $9.2 \times 10^7$ | $1.6 \times 10^6$ | 98.26% |
| Secu-GB3-260503 | 1 | $9.8 \times 10^7$ | $1.4 \times 10^6$ | |
| | 2 | $8.6 \times 10^7$ | $7.7 \times 10^5$ | |
| G. Mean | | $9.2 \times 10^7$ | $1.0 \times 10^6$ | 98.91% |
| Secu-GB4-260503 | 1 | $9.8 \times 10^7$ | $7.9 \times 10^5$ | |
| | 2 | $8.6 \times 10^7$ | $1.2 \times 10^6$ | |
| G. Mean | | $9.2 \times 10^7$ | $9.7 \times 10^5$ | 98.95% |
| Secu-GB5-260503 | 1 | $9.8 \times 10^7$ | $5.6 \times 10^5$ | |
| | 2 | $8.6 \times 10^7$ | $5.4 \times 10^5$ | |
| G. Mean | | $9.2 \times 10^7$ | $5.5 \times 10^5$ | 99.40% |
| Secu-C-A-260503 | 1 | $9.8 \times 10^7$ | $3.6 \times 10^5$ | |
| | 2 | $8.6 \times 10^7$ | $7.2 \times 10^5$ | |
| G. Mean | | $9.2 \times 10^7$ | $5.1 \times 10^5$ | 99.45% |
| Secu-C-B-260503 | 1 | $9.8 \times 10^7$ | $6.3 \times 10^5$ | |
| | 2 | $8.6 \times 10^7$ | $4.2 \times 10^5$ | |
| G. Mean | | $9.2 \times 10^7$ | $5.1 \times 10^5$ | 99.45% |
| Secu-C-C-260503 | 1 | $9.8 \times 10^7$ | $1.9 \times 10^6$ | |
| | 2 | $8.6 \times 10^7$ | $1.5 \times 10^6$ | |
| G. Mean | | $9.2 \times 10^7$ | $1.7 \times 10^6$ | 98.15% |
| Secu-C-D-260503 | 1 | $9.8 \times 10^7$ | $2.3 \times 10^6$ | |
| | 2 | $8.6 \times 10^7$ | $2.0 \times 10^6$ | |
| G. Mean | | $9.2 \times 10^7$ | $2.1 \times 10^6$ | 97.72% |
| Secu-C-E-260503 | 1 | $9.8 \times 10^7$ | $4.1 \times 10^6$ | |
| | 2 | $8.6 \times 10^7$ | $3.9 \times 10^6$ | |
| G. Mean | | $9.2 \times 10^7$ | $4.0 \times 10^6$ | 95.65% |

Notes:
Counts per test are means of replicates
G. Mean = Geometric Mean (Log mean)

The products were found to have significant biocidal properties over the 24 hour period under the above test conditions.

Key to Antimicrobial Additive Formulations

There were 3 groups of as samples as shown below. Tables 3 and 4 were triclosan-treated samples. As can be seen, the samples were made in duplicates but were labeled differently; for example, GB1 in Table 3 had the same percentage of triclosan as sample E in Table 4.

TABLE 3

| Samples | ppm Agent | Labeled Side |
|---|---|---|
| GB1 | 625 | Treated |
| GB2 | 1250 | Treated |
| GB3 | 2500 | Treated |
| GB4 | 5000 | Treated |
| GB5 | 10,000 | Treated |

TABLE 4

| Treated Blind Samples | | |
|---|---|---|
| Sample | ppm Agent | Labeled Side |
| A | 2500 | Treated |
| B | 10,000 | Treated |
| C | 1250 | Treated |
| D | 5000 | Treated |
| E | 625 | Treated |

The control sample containing no antimicrobial additive predictably had no ability to kill bacteria; instead, the number of bacteria actually increased over the assay period. However, all other test samples containing various concentrations of antimicrobial additive displayed strong bactericidal efficacy, in most cases more than 99% kill.

From the strong log reductions observed even at 625 ppm 2,4,4'-trichloro-2'-hydroxydiphenyl ether, it is reasonably expected that the antimicrobial agents disclosed herein may be used with efficacy at concentrations ranging from about 500 ppm to about 20,000 ppm.

In another embodiment of the currency, two or more antimicrobial agents can be combined in the article. In one instance, a first antimicrobial agent can be incorporated in the planar material and a second antimicrobial agent in the acrylate coating layer (by way of disposal in the acrylate coating composition to be applied to at least a first surface of the planar material). Alternatively, the multiple antimicrobial agents may together be disposed in either of the planar material or the acrylate coating composition/layer.

Use of two or more antimicrobial agents permits the selection of antimicrobial agents having specific activities, for example against different microbes or with varying rates of antimicrobial efficacy.

It will therefore be readily understood by those persons skilled in the art that the present composition and methods are susceptible of broad utility and application. Many embodiments and adaptations other than those herein described, as well as many variations, modifications and equivalent arrangements, will be apparent from or reasonably suggested to one of ordinary skill by the present disclosure and the foregoing description thereof, without departing from the substance or scope thereof.

Accordingly, while the present composition and methods have been described herein in detail in relation to its preferred embodiment, it is to be understood that this disclosure is only illustrative and exemplary and is made merely for purposes of providing a full and enabling disclosure. The foregoing disclosure is not intended or to be construed to limit or otherwise to exclude any such other embodiments, adaptations, variations, modifications and equivalent arrangements.

What is claimed is:

1. A currency, comprising:

a planar material having at least a first surface;

a first antimicrobial agent disposed in a polymer comprising the planar material;

an acrylate polymeric coating affixed to the at least first surface of the planar material; and a second antimicrobial agent disposed in the acrylate polymeric coating affixed to the at least first surface of the planar material; and wherein the first antimicrobial agent is different from the second antimicrobial agent.

2. The currency according to claim 1 wherein the first antimicrobial agent is an inorganic antimicrobial agent.

3. The currency of claim 2 wherein the first antimicrobial agent is one of silver zeolite; silver in amorphous glass; silver sol/gel; copper zeolite;

copper in amorphous glass; copper sol/gel; zinc zeolite; zinc in amorphous glass; or zinc sol/gel.

4. The currency of claim 2 wherein the first antimicrobial agent is one of zinc pyrithione; sodium pyrithione; photocatalytic titanium dioxide; or barium metaborate monohydrate.

5. The currency according to claim 1 wherein the first antimicrobial agent is an organic antimicrobial agent.

6. The currency of claim 5 wherein the first antimicrobial agent is one of 2,4,4'-trichloro-2'-hydroxydiphenyl ether; diiodomethyl p-tolylsulfone; an azole such as propiconazole; polyhexamethylene biguanide hydrochloride; or 3,4,4'-trichlorocarbanilide.

7. The currency of claim 5 wherein the first antimicrobial agent is an isothiazolone-based compound such as 1,2-benzisothiazolin-3-one, N-butyl-1,2-benzisothiazolin-3-one, 2-octyl-isothiazolone, 4,5-dichloro-2-N-octyl-3(2H)-isothiazolone, methyl-3(2H)-isothiazolone, or chloro-2-methyl-3(2H)-isothiazolone.

8. The currency of claim 1 wherein the first antimicrobial agent has a concentration in the range of from about 500 ppm to about 20,000 ppm.

9. The currency of claim 1 wherein the first antimicrobial agent has a concentration in the range of from about 500 ppm to about 10,000 ppm and the second antimicrobial agent has a concentration in the range of from about 500 ppm to about 10,000 ppm.

10. A method for manufacturing a currency, comprising:

providing a planar material at least partly composed of a polymer and having at least a first surface, the polymer having a first antimicrobial agent disposed therein;

applying an acrylate coating composition to the at least first surface of the planar material, the acrylate coating composition containing a second antimicrobial agent; and polymerizing the acrylate coating composition to form an acrylate coating layer on the at least first surface of the planar material wherein the first antimicrobial agent is different from the second antimicrobial agent.

11. The method of claim 10 wherein the first antimicrobial agent is an inorganic antimicrobial agent.

12. The method of claim 11 wherein the first antimicrobial agent is one of silver zeolite; silver in amorphous glass; silver sol/gel; copper zeolite; copper in amorphous glass; copper sol/gel; zinc zeolite; zinc in amorphous glass; or zinc sol/gel.

13. The method of claim 11 wherein the first antimicrobial agent is one of zinc pyrithione; sodium pyrithione; photocatalytic titanium dioxide; or barium metaborate monohydrate.

14. The method of claim 10 wherein the first antimicrobial agent is an organic antimicrobial agent.

15. The currency of claim 14 wherein the first antimicrobial agent is one of 2,4,4'-trichloro-2'-hydroxydiphenyl ether; diiodomethyl p-tolylsulfone; an azole such as propiconazole; polyhexamethylene biguanide hydrochloride; or 3,4,4'-trichlorocarbanilide.

16. The currency of claim 14 wherein the first antimicrobial agent is an isothiazolone-based compound such as 1,2-benzisothiazolin-3-one, N-butyl-1,2-benzisothiazolin-3-one, 2-octyl-isothiazolone, 4,5-dichloro-2-N-octyl-3(2H)-isothiazolone, methyl-3(2H)-isothiazolone, or chloro-2-methyl-3(2H)-isothiazolone.

17. The currency of claim 10 wherein the first antimicrobial agent has a concentration in the range of from about 500 ppm to about 20,000 ppm.

* * * * *